Aug. 19, 1958   A. M. SULLIVAN   2,847,714
METHOD OF MAKING CENTRIFUGAL CASTINGS
Filed Jan. 23, 1956   3 Sheets-Sheet 1

INVENTOR:
ARTHUR M. SULLIVAN
BY
ATT'Y

Aug. 19, 1958   A. M. SULLIVAN   2,847,714
METHOD OF MAKING CENTRIFUGAL CASTINGS
Filed Jan. 23, 1956   3 Sheets-Sheet 2

INVENTOR:
ARTHUR M. SULLIVAN
BY
ATT'Y

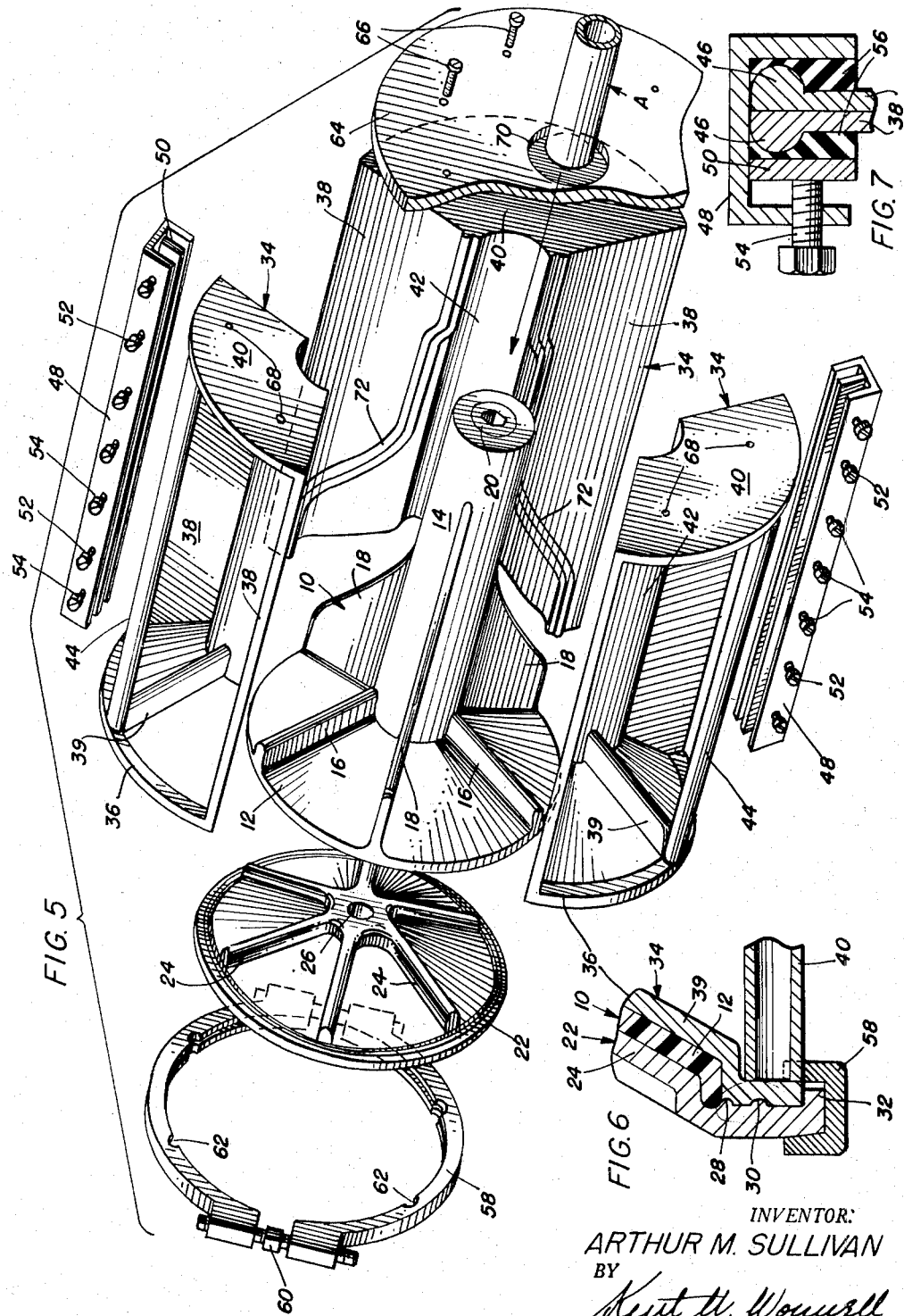

United States Patent Office 2,847,714
Patented Aug. 19, 1958

2,847,714
METHOD OF MAKING CENTRIFUGAL CASTINGS

Arthur M. Sullivan, Downers Grove, Ill., assignor to Walter J. Maker, La Grange, Ill.

Application January 23, 1956, Serial No. 560,734

4 Claims. (Cl. 18—58.3)

This invention relates in general to the manufacture of various articles from fusible, resinous substances, and it is more particularly described as applied to the making of plastic washing machine agitators by this new method.

Practically all washing machine agitators are currently made by compression molding in costly hydraulic equipment from a phenolic type of molding powder.

Due to the dark color inherent in phenolic resins, light colored and pastel shade agitators are not possible. The washing machine industry is now using black agitators but this is not from choice and a white, gold or any pastel shade is in much demand especially from a sales appeal angle.

It is an important general object of this invention to produce various articles of manufacture and particularly washing machine agitators from fusible plastic materials which are light in color, that is, white, light blue or green, yellow and other pastel shades which possess satisfactory resistance to hot and cold soap solutions.

Another object of this invention is to produce the articles in one piece, in a single operation and in inexpensive molds, and having fins which are cast integrally with a hollow center section eliminating any separable junction.

Still another object of the invention is to produce articles reinforced with strengthening materials such as glass floc, glass fiber mat, or cloth asbestos or similar reinforcements.

A further object of the invention is to produce glass fiber reinforced articles of light-weight and high structural strength free from entrapped air.

Still another object of the invention is to produce a highly desirable smooth surface finish on the completed articles when glass fiber mats and cloth are used as reinforcements.

Still a further object of the invention is to produce various articles of manufacture and particularly a washing machine agitator by vertical or horizontal centrifugal casting at low rotational speed and without expensive tooling.

Other objects of the invention will appear in the specification and will be apparent from the accompanying drawings in which, Fig. 1 is a side elevation of a centrifugal casting apparatus for producing a washing machine agitator by rotation upon a horizontal axis.

Fig. 5 is a perspective exploded view of the molding parts which are assembled in Fig. 1.

Fig. 6 is a fragmentary enlargement of a joint as shown in Fig. 1; and

Fig. 7 is a sectional detail of the parts as taken on the line 7—7 of Fig. 1.

Figure 1:
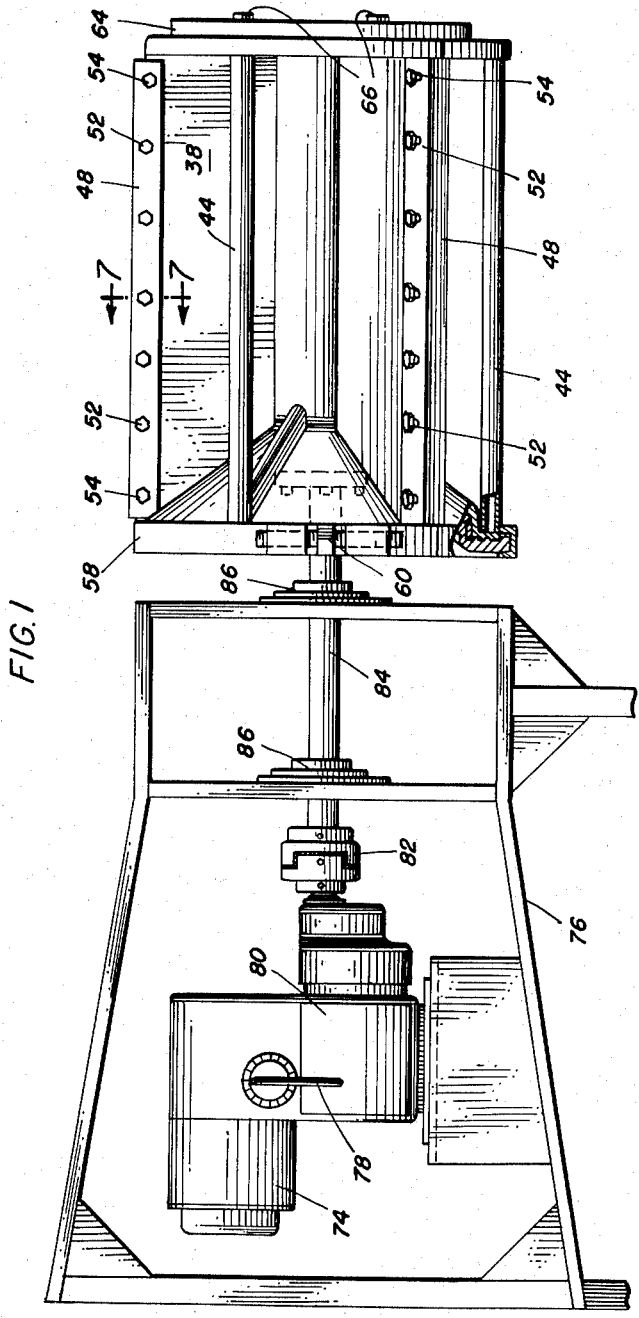
Figure 3:
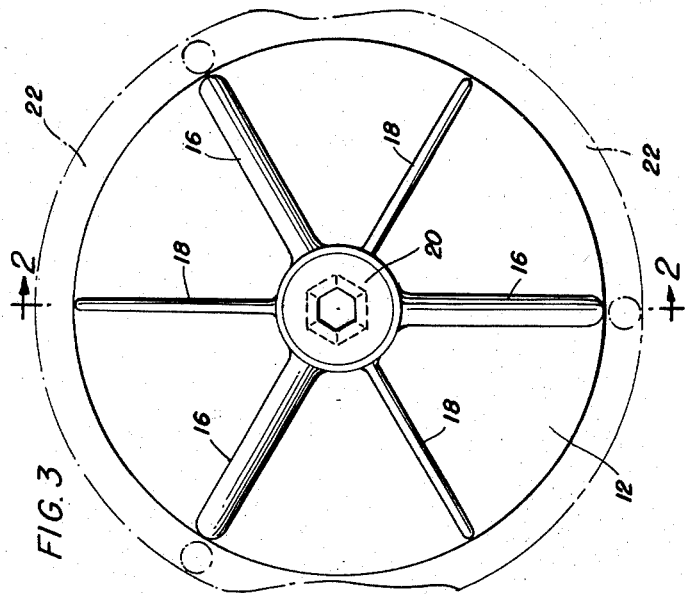
Fig. 3 is a bottom view of the molding apparatus as shown in Fig. 2.

To produce agitators having the above novel features, it is proposed to use liquid plastic resins which are thermosetting in their chemical nature. The polyesters and epoxies are two of such resins which after catalysis are transformed from their original liquid state to a hard, infusible mass. Being thermosetting in their nature, these resins will not distort appreciably when subjected to a mild elevated temperature of from 150° F. to 200° F. Examples of such resins are The Glidden Company's Glidpol 1001 polyester, and Shell Chemical Company's Epon 828 epoxy resin.

It is proposed to use a very versatile process which takes advantage of the liquid characteristics of these resins, which upon catalysis are capable of curing to hard masses without any great pressures. This proposed process of manufacture is based upon centrifugal force.

Referring now more particularly to the drawings, the invention is described as applied to the production of a one-piece agitator as commonly used for mechanical washing machines.

An agitator 10 as shown in Fig. 5 has a circular base 12 with a central upright hollow stem 14 with supporting radial ridges 16 in the base extending to the stem, and radial ribs 18 between the ridges extending from the median portion of the stem 14 and inclined outwardly to the outer edge of the base 12. In a completed agitator, a supporting nut 20 is inserted and securely fastened to the upper end of the stem to provide a rigid support for the upper end of an oscillating shaft of a washing machine in accordance with well known washing machine practices.

In producing a casting of the agitator, a mold is required which comprises a circular base 22 with upward radial ribs 24, the central portion of the base and the ribs thereon being inclined upwardly to a hub having a central opening 26. In the outer periphery of the base are circular ribs 28 and 30 and an upstanding marginal flange 32. Extending around the base and upwardly therefrom are three mold sections 34 each comprising one-third of the circumference and having a flange base 36 to fit within the marginal flange 32 of the base 24. The base is inclined upwardly from the outer edge to conform to the inclination of the base 12, it has radial ridges 39 which provide a space between it and the adjacent corresponding portion of the base 22 and its ridges 16. At the edges of each section are side plates 38 joined to a top plate 40 and having a circular wall 42 which integrally joins the top and side plates and the base 36. Also rigidly connected between the top plate 40 and the base 36 is a strengthening bar 44 which holds the top and bottom parts together and in spaced relation and provides a convenient means for handling it. This bar is preferably hollow for lightness and strength and is located intermediate the side plates 38 at the end of the ridge 39.

At the outer peripheral edge of each side plate 38 is a rounded projection 46 opposite the edge which contacts with the side plate of the adjacent section 34 so that the mating edges of the sections 38 may be clamped tightly together by means of a channel strip 48 which extends over them, a clamping bar 50 disposed in the channel and held loosely in place therein by studs 52 which extend loosely through the side wall of the channel strip and having other clamping screws 54 which are threaded through the wall of the channel and engage the clamping bar 50 to tighten it in place against the side plates 38 and including a strip gasket 56 which may be placed between the clamping bar 50 and the adjacent side plate 38.

When the sections 34 are placed together, the bases 36 form a circle which is seated upon the base 22 and preferably within the flange 32 so that a split clamping collar 58 in channel form may be placed over the edges of these base parts and the collar tightened thereon by means of a double screw 60 for clamping the parts altogether. The clamping collar may be provided with notches 62 at intervals to receive the edges of the side plates and the outer ends of the ridges 39.

The outer or top ends of the sections 34 may be secured together by a circular clamping means similar to the clamping collar 58 or a top clamping plate 64 may be secured to the ends of the sections 34 by fastening bolts 66 inserted through the plate 64 and into suitably threaded openings 68 in the top plates 40 of the sections. At the center of the clamping plate is a pouring opening 70 which is thus located at the upper end of the complete circular opening which is produced by the three circular sections 42 when the molding sections 34 are placed together.

In the outer mating faces of the end walls of each section are ridges 72 which when placed together in mating relation with the corresponding ridges of the other sections will produce the ribs 18 of the agitator, the ridges 16 of the agitator being produced by the spaced relation of the ridges 24 of the base 22 and the ridges 39 of the molding sections 34. In order to rotate the assembled parts of the mold as shown in Fig. 5, an engine or motor 74 is mounted in a supporting frame 76 and has controlling means 78 for regulating and changing the speed of the motor. The motor is connected by a gearing 80 through a coupling 82 with a driving shaft 84 suitably mounted in bearings 86 carried by the frame. The end of the shaft is suitably connected to the base 22 for operating it at the speed of the shaft.

As shown in Fig. 1, the mold as above described in assembled form is attached to the rotating shaft 84 in horizontal position and the motor is capable of rotating the mold at from 2-1500 revolutions per minute or any speed which is necessary to produce the desired centrifugal force. While the mold is spinning, a polyester resin which has been catalyzed and pigmented if desired, is introduced through the opening in the top plate 64 as represented by a feeding tube A as shown in Fig. 5. When the liquid resin engages the inner surface of the mold, the centrifugal force developed by spinning the mold first forces the resin to fill the cavities which form the fins 18 and the ridges 16. When the outer cavities are filled, the resin will then build up on the inside circumference of the mold to any desired thickness, thus producing a hollow center of constant inside diameter and depending upon the amount of resin which is inserted in the mold.

While the mold and its plastic resin charge are spinning, the resin is partially cured and may be completed by applying a heat up to 150° F.–200° F. to the mold for a period of from 12–15 minutes. Faster curing cycles are accomplished by adding catalyzed resin to a spinning mold which is preheated. The resin may be colored with titanium dioxide to produce a white agitator and by other ingredients to produce agitators of other colors. When the polyester resin has solidified to an infusible mass, the agitator is removed from the mold by separating the mold parts in any suitable manner.

Figure 2:
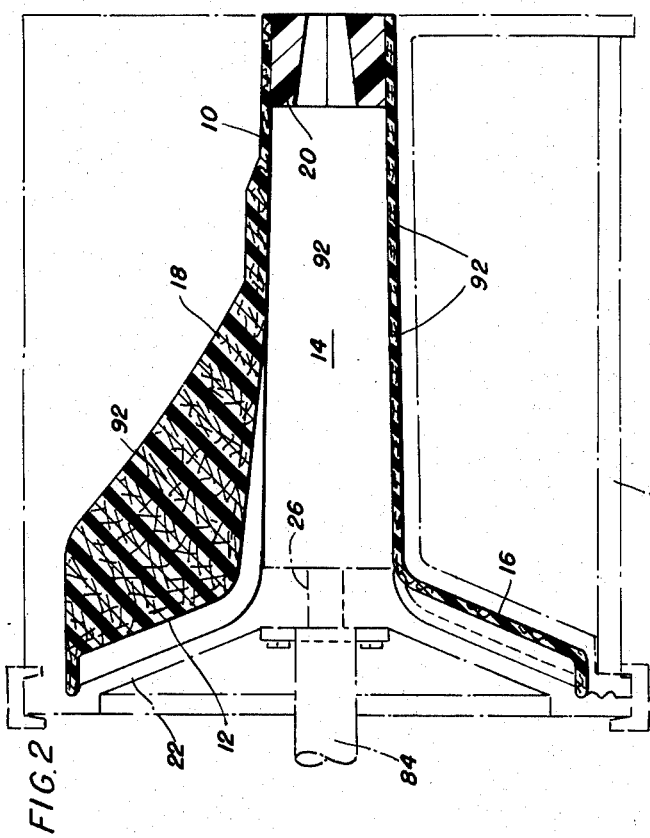
Fig. 2 is a sectional view of the molding apparatus as taken on the line 2—2 of Fig. 3.

This method also lends itself to the production of agitators which are reinforced with various fibrous materials. A satisfactory reinforcement is glass fiber 92 either in woven or matted form which is represented as inserted in the material of Fig. 2. Actually, the glass fiber material may be preformed and inserted in the cloth or mat form while the mold parts are being assembled and to the desired thickness. With such reinforcement, it is possible in conjunction with the liquid resin to produce lighter agitators having thinner sections and with greater strengths. A light-weight agitator has many advantages and by inserting such reinforcement into the ribs or fins of the agitator, these portions are greatly strengthened and the liquid resins will penetrate through and around the fibrous network or reinforcement in incorporating the reinforcement within the agitator with a smooth outer surface.

Figure 4:
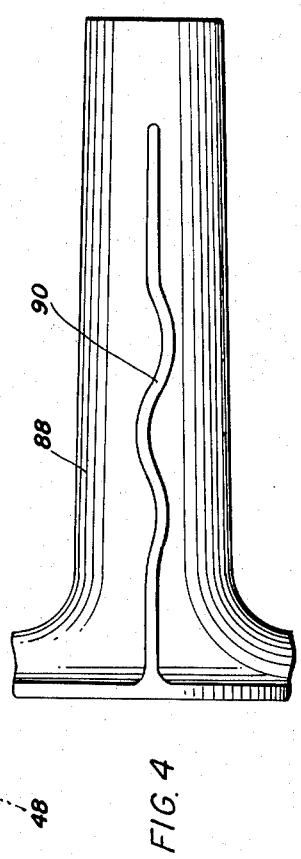
Fig. 4 is a fragmentary perspective showing a wavy rib as compared with a straight rib as shown in Fig. 3.

With this process and apparatus, it is also possible to produce agitators 88 as shown in Fig. 4 with wavy ribs or fins 90, it being necessary only to make a proper change in the mold parts to produce this result, the plastic material will run on readily into the curved or wavy ribs as into the straight ones, and the wavy ones may produce an improved agitating action.

After an agitator is completely molded with its central stem of the desired thickness and internal diameter, a preformed supporting nut 20 may be placed in the open end of the hollow stem and allowed to cure and become set in place within the agitator or this supporting nut may be placed in position and cemented or otherwise fastened to the stem after the agitator is otherwise cured and hardened.

Various materials and compositions may be used in carrying out this method in a satisfactory manner. Two typical methods with the ingredients used are:

*Example No. 1*

This mixture was prepared for introduction into the spinning mold.

| | Percent |
|---|---|
| Glidpol 1001 polyester | 67 |
| Calcium carbonate | 30 |
| Titanium dioxide white pigment | 3 |

Glidpol 1001 polyester resin is produced by The Glidden Company, and is composed of a saturated polyhydric alcohol and ethylenically-unsaturated polycarboxylic acids dissolved in a polymerizable ethylenically unsaturated monomer.

One-half percent of cobalt naphthenate containing 6% cobalt, based on the weight of the polyester resin, was added to the above mixture followed by one percent methyl ethyl ketone peroxide (60% in dimethyl phthalate).

After a thorough agitation, 3½ lbs. of the catalyzed mixture was introduced into a spinning mold at room temperature of 77° F. Gellation occurred within six minutes after catalysis. The mold was rotated at 600 revolutions per minute and after gellation, the rotation was discontinued and the mold removed and placed in an oven at 200° F. for thirty minutes producing a thorough cure. The resulting cast agitator possesses a smooth white glossy, hard and abrasion resistant surface which after an immersion period of 100 hours in a 1% Rinso soap solution at 160° F. showed no apparent deterioration. Also when sections of the agitator were cut, it exhibited no bubbles or entrapped air.

*Example No. 2*

The three center sections of an agitator mold, comprising the ribs, base and stem forming portions were coated by spraying them with 0.030 inch (30 mils) of the following mixture:

| | Percent |
|---|---|
| Titanium dioxide white pigment | 13 |
| Cab-O-Sil (silica gel) | 2 |
| Silica (325 mesh) | 20 |
| Glidpol 1001 polyester resin | 50 |
| Styrene monomer | 15 |

Before spraying, the mixture was catalyzed with one-half of 1% cobalt naphthenate (6% cobalt) and 2% methyl ethyl ketone peroxide (60% in dimethyl phthalate). Catalysis was based on the total mixture.

After 15 minutes at room temperature of 77° F., the coating gelled and cured and the exposed surface was tacky. Fiberglas cloth (United Merchant's No. 1000) was cut to conform to the shape of the fins, base and neck and applied over the tacky surface. The mold parts were then assembled and arranged for operation by the motor which was rotated at 600 revolutions per minute.

The same quantity of the resin mixture of Example No. 1 was added to the spinning mold. This resin upon gellation, coreacted with the tacky coating resin previously applied to the mold which produced an agitator with its exterior surface showing no glass cloth pattern. Not only was the fiber pattern suppressed, but a durable smooth, glossy, abrasion and soap resistant outer surface was produced. This kind of a surface is highly desirable in a washing machine agitator which is used with fine fabrics such as silk and nylon as rough surfaces causes snags in these fabrics. A gel coating system thus becomes integrally united by chemical reaction with the casting resin forming an inseparable bond.

By the use of accelerators and organic peroxides, it is possible to have the resin gel in 5–10 minutes. Before gellation, all air is forced from resin, and the resin is solidly compacted by centrifugal force. After solidification has taken place, the mold is removed from the spinning motor and placed in an oven for a short interval for a complete cure. It is normally cured for one-half hour at 200° F., and after curing, the mold is dismantled and the agitator removed from the mold.

This method of molding is preferred to the compression molding of agitators of phenolic powders due to the use of light colored resins, polyester, epoxies and other thermo-setting types, white agitators or other light and pastel colors are possible; since polyester resins require very little pressure for conversion after catalysis, as compared with a contact pressure of from 2000–4000 lbs. per square inch which is required for phenolic powders, and inexpensive tooling and equipment is used in the present invention which results in savings in cost and weight. The mold parts may be produced in thin sections of lightweight metals such as aluminum or magnesium and even plastic forms may be used. Intricate shapes and contours are easily produced by designing molds which may be easily dismantled; and by the use of glass cloth or glass mat reinforcement, in the agitator, a very sturdy structure of lighter weight is produced.

While a preferred product is produced by the method of this invention, it should be regarded as an illustration or example rather than as a limitation or restriction of the invention, since various changes in the construction, combination and arrangement of the parts may be made without departing from the spirit and scope of the invention.

I claim:

1. The method of centrifugally casting liquid plastic thermosetting resins in a circular integral unit by assembling a plurality of similar connected mold parts coated on their inner resin contacting surfaces with a catalyzing mixture, the step of adding preformed mats of fibrous reinforcing material into the mold parts while they are being assembled, adding plastic thermosetting resins to the rotating mold, continuing the rotation until the resins become set, and heating the mixture until it becomes solid.

2. The method of centrifugally casting liquid plastic thermosetting resins to the rotating mold, continuing the sembling a plurality of similar connected mold parts coated on their inner resin contacting surfaces with a catalyzing mixture, the step of first applying a catalyzing coating to the inner surfaces of the mold until said surfaces become tacky and then applying glass fiber mats cut to conform to the shapes of different portions of the mold and applied to the tacky surfaces, adding plastic thermosetting resins to the rotating mold, continuing the rotation until the resins become set, and heating the mixture until it becomes solid.

3. The method of centrifugally casting liquid plastic thermosetting resins in a circular integral unit by assembling a plurality of similar connected mold parts coated on their inner resin contacting surfaces with a catalyzing mixture, adding plastic thermosetting resins to the rotating mold, continuing the rotation until the resins become set, and heating the mixture until it becomes solid, in which the catalyzing mixture is applied to the interior surfaces of the mold before the plastic resins are inserted, applying glass fiber reinforcing pads to the catalyzing surfaces before said mixture becomes dry to hold the fiber in place and thereafter applying the liquid thermosetting resins thereto to produce with the catalyzing mixture a smooth glossy outer surface on the outside of the agitator free from surface markings of the glass fiber pads.

4. The method of centrifugal casting in accordance with claim 3 in which the thermosetting plastic resins are clear and transparent, and inserting a colorful preformed material in the mold before the transparent resin is applied thereto, the rotation of the mold with the colorful preformed material continuing until the resin becomes set with the patterned material therein, and heating the said mixture until it becomes solid with the patterned material showing from the outside of the solid casting through the transparent plastic resin thereof.

References Cited in the file of this patent

UNITED STATES PATENTS

| | | |
|---|---|---|
| 2,573,693 | De Bell | Nov. 6, 1951 |
| 2,739,917 | Schulze | Mar. 27, 1956 |
| 2,748,045 | Kelly | May 29, 1956 |